United States Patent
Ozawa et al.

(10) Patent No.: US 6,660,969 B2
(45) Date of Patent: Dec. 9, 2003

(54) INTERNAL COMBUSTION ENGINE DEVICE

(75) Inventors: Ikuo Ozawa, Kariya (JP); Kazuaki Kafuku, Kariya (JP); Harumi Okai, Kariya (JP); Noriaki Maeda, Kariya (JP); Toshiki Sugiyama, Kariya (JP); Norihisa Sasano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/202,493

(22) Filed: Jul. 24, 2002

(65) Prior Publication Data

US 2003/0029852 A1 Feb. 13, 2003

(30) Foreign Application Priority Data

Jul. 25, 2001 (JP) ........................................ 2001-224650
Sep. 7, 2001 (JP) ........................................ 2001-272192

(51) Int. Cl.⁷ .................................................. B60L 1/02
(52) U.S. Cl. ....................... 219/205; 123/336; 123/339; 123/399
(58) Field of Search ................................ 219/205, 492, 219/494, 497, 541; 123/336, 339, 399, 556, 549

(56) References Cited

U.S. PATENT DOCUMENTS

| | | | |
|---|---|---|---|
| 4,365,606 A | * 12/1982 | Endo | 123/556 |
| 5,076,248 A | * 12/1991 | Schatz | 123/556 |
| 5,080,061 A | * 1/1992 | Nishimura | 123/339.15 |
| 5,758,621 A | * 6/1998 | Suzuki et al. | 123/399 |
| 5,977,525 A | * 11/1999 | Sahashi | 219/494 |
| 5,996,560 A | * 12/1999 | Schechter | 123/556 |

FOREIGN PATENT DOCUMENTS

| | | |
|---|---|---|
| JP | 57-186043 | 11/1982 |
| JP | 3-78537 | 4/1991 |

* cited by examiner

*Primary Examiner*—Sang Paik
*Assistant Examiner*—Vinod D. Patel
(74) *Attorney, Agent, or Firm*—Harness, Dickey & Pierce, PLC (57) ABSTRACT

When a load given to the engine 100 is less than a predetermined value, the outside air suction port 104 is closed and only inside air is supplied to the engine 100, and the valve 112a is opened so as to supply warm water to the heater 112. When the load given to the engine 100 is not less than the predetermined value and the temperature of air outside the engine compartment 11 is lower than a predetermined value, the inside air suction port 102 is closed and only outside air is supplied to the engine 100, and the valve 112a is closed so that the supply of warm water to the heater 112 is stopped.

11 Claims, 8 Drawing Sheets

Fig.6A $\phi A > \phi B > a > b$

| TEMPERATURE OF ENGINE COOLING WATER | PRESSURE OF A/C REFRIGERANT | DOOR CONTROL | |
| --- | --- | --- | --- |
| | | REFRIGERANT WIND DOOR | SUCTION CHANGE-OVER DOOR |
| NOT MORE THAN PREDETERMINED VALUE | NOT MORE THAN PREDETERMINED VALUE | CLOSED | SUCTION OF INSIDE AIR (WARM AIR) |
| NOT LESS THAN PREDETERMINED VALUE | NOT MORE THAN PREDETERMINED VALUE | OPENED | SUCTION OF OUTSIDE AIR (COLD AIR) |
| NOT MORE THAN PREDETERMINED VALUE | NOT LESS THAN PREDETERMINED VALUE | OPENED | SUCTION OF OUTSIDE AIR (COLD AIR) |
| NOT LESS THAN PREDETERMINED VALUE | NOT LESS THAN PREDETERMINED VALUE | OPENED | SUCTION OF OUTSIDE AIR (COLD AIR) |

INTERNAL COMBUSTION ENGINE DEVICE

BACKGROUND OF THE INVENTION

1. Technical Field of the Invention

The present invention relates to an internal combustion engine device and is intended to control suction air sucked into an internal combustion engine and also to control a cooling capacity of a radiator of the internal combustion engine.

2. Prior Art

In a common internal combustion engine, there is provided a throttle valve. When the degree of opening of the throttle valve is adjusted, a volume of suction air sucked into the internal combustion engine is controlled so that an output of the engine can be controlled.

In this connection, when the temperature of outside air is low, there is a possibility that the throttle valve, especially the throttle valve for adjusting an idling speed of the engine, the suction air passage of which is small, is frozen so that the throttle valve can not be normally operated.

In order to solve the above problems, Japanese Unexamined Patent Publication No. 3-78537 discloses a technique in which the throttle valve is heated by engine coolant (warm water) so as to prevent the throttle valve from freezing.

In this connection, in the internal combustion engine, a mixture in which air and fuel are mixed with each other is compressed, ignited and burned (exploded) to obtain motive power. Therefore, in the case of cold start, that is, in the case where the engine is started in a cold state, it is easy to evaporate (vaporize) fuel when the temperature of air (suction air) is relatively high. Therefore, the startability of the engine can be enhanced.

On the other hand, in the case where the temperature of suction air is high when the engine temperature has been sufficiently raised after the completion of warming up, the density of suction air (oxygen) is decreased. Accordingly, there is a possibility that the mass of suction air is decreased and the engine output is lowered.

Therefore, the present inventors made investigation into a suction air control system to change over between the case in which air inside the engine compartment (referred to as inside air hereinafter) is supplied to the engine according to a state of operation of the engine and the case in which air outside the engine compartment (referred to as outside air hereinafter) is supplied to the engine. Also, the present inventors made investigations into a radiator control system to control a volume of cooling air flow supplied to the radiator according to a state of operation of the engine.

However, in these investigations, the following problems may be encountered. In the case of supplying outside air to the engine, when the temperature of outside air is low and the throttle valve is heated by warm water to prevent the throttle valve from freezing, the temperature of suction air is raised and the engine output is decreased.

SUMMARY OF THE INVENTION

The present invention has been accomplished to solve the above problems. It is an object of the present invention to provide an internal combustion engine device capable of preventing an output of the internal combustion engine from lowering while a suction air volume adjustment means for adjusting a volume of suction air such as a throttle valve is prevented from freezing.

In order to accomplish the above object, the present invention provides an internal combustion engine device comprising: a suction air duct for introducing combustion air into an internal combustion engine; an inside air introducing duct having an inside air suction port for taking in air from an engine compartment into which the internal combustion engine is incorporated, the inside air introducing duct introducing the thus taken inside air into the suction air duct; an outside air introducing duct having an outside air suction port for taking in outside air from the outside of the engine compartment, the outside air introducing duct introducing the thus taken outside air into the suction air duct; an inside and outside air volume adjusting means for adjusting a ratio of a volume of inside air to that of outside air introduced into the suction air duct; a suction air volume adjusting means for adjusting a volume of all air supplied to the suction air duct; a heating means for heating the suction air volume adjusting means, the heating means being capable of variably controlling the heating; and a control means for controlling the suction air volume adjusting means and heating means, wherein when a load of the internal combustion engine is lower than a predetermined value, the inside and outside air volume adjusting means is controlled by the control unit so that the inside air, the volume of which is larger than that of the outside air, can be supplied to the internal combustion engine, and the heating means is controlled so that the suction air volume adjusting means can be heated.

Due to the foregoing, the inside air of relatively high temperature can be sucked into the internal combustion engine, and the air supplied to the internal combustion engine can be heated by the heating means for heating the suction air volume adjusting means. Therefore, the suction air of relatively high temperature can be supplied to the internal combustion engine, and the fuel consumption can be enhanced.

In this connection, in the present invention, the inside and outside air volume adjusting means for adjusting the volumes of the inside and the outside air and the variable throttle means, which is arranged on the downstream side of an air current of the inside and outside air volume adjusting means, for variably controlling the air passage area, compose a suction air volume adjusting means, and the heating means may heat at least the variable throttle means in the suction air volume adjusting means.

When a load of the internal combustion engine is not less than a predetermined value and the outside air temperature detected by the outside air temperature detecting means is lower than a predetermined value, the outside air, the volume of which is larger than that of the inside air, is supplied to the internal combustion engine and the suction air volume adjusting means is heated. Due to the foregoing, according to the operation state (load state) of the internal combustion engine, suction air of an appropriate temperature can be supplied to the internal combustion engine, and further it becomes possible to prevent the suction air volume adjusting means from freezing.

Further, in the present invention, when a load of the internal combustion engine is not less than a predetermined value and the outside air temperature detected by the outside air temperature detecting means is not less than a predetermined value, the outside air, the volume of which is larger than that of the inside air, is supplied to the internal combustion engine and the suction air volume adjusting means is not heated. Then, suction air of relatively low temperature can be supplied to the internal combustion engine when a load given to the internal combustion engine is high. Therefore, the fuel consumption can be more enhanced. In the present invention, the internal combustion engine device further comprises a radiator air flow volume adjusting means for adjusting a volume of an air flow passing through the radiator. Due to the foregoing, the coolant temperature can be adjusted.

In the present invention, the inside and outside air volume adjusting means and radiator air flow volume adjusting means are mechanically linked with each other and operated by one drive means. Due to the foregoing, the number of parts composing the system can be reduced.

In the present invention, the inside and outside air volume adjusting means includes a belt-shaped first opening and closing door for opening and closing an air passage, arranged between the inside air introducing duct and outside air introducing duct, and the radiator air flow volume adjusting means includes a plurality of belt-shaped second opening and closing doors which are arranged in a louver window shape, wherein the first and the second opening and closing door are driven by a link member connected with the drive means.

In the present invention, a support section (25) for pivotally supporting both the opening and closing doors (61, 63) may be arranged on a front end panel arranged in the front end portion of a vehicle extending in the width direction of the vehicle.

In the present invention, the suction air introducing duct (22), inside air introducing duct (23) and outside air introducing duct (24) may be formed on the front end panel.

In the present invention, the front end panel may be formed integrally with a shroud (21) for covering a gap between the radiator (30) and the fan (50), which sends a cooling wind for cooling the radiator (30), so that an air current generated by the fan (50) can not go around the radiator (30).

The present invention will become more apparent from the accompanying drawings and the preferred embodiments of the present invention.

DETAILED DESCRIPTION OF THE PREFERRED EMBODIMENTS (First Embodiment)

Figure 1:
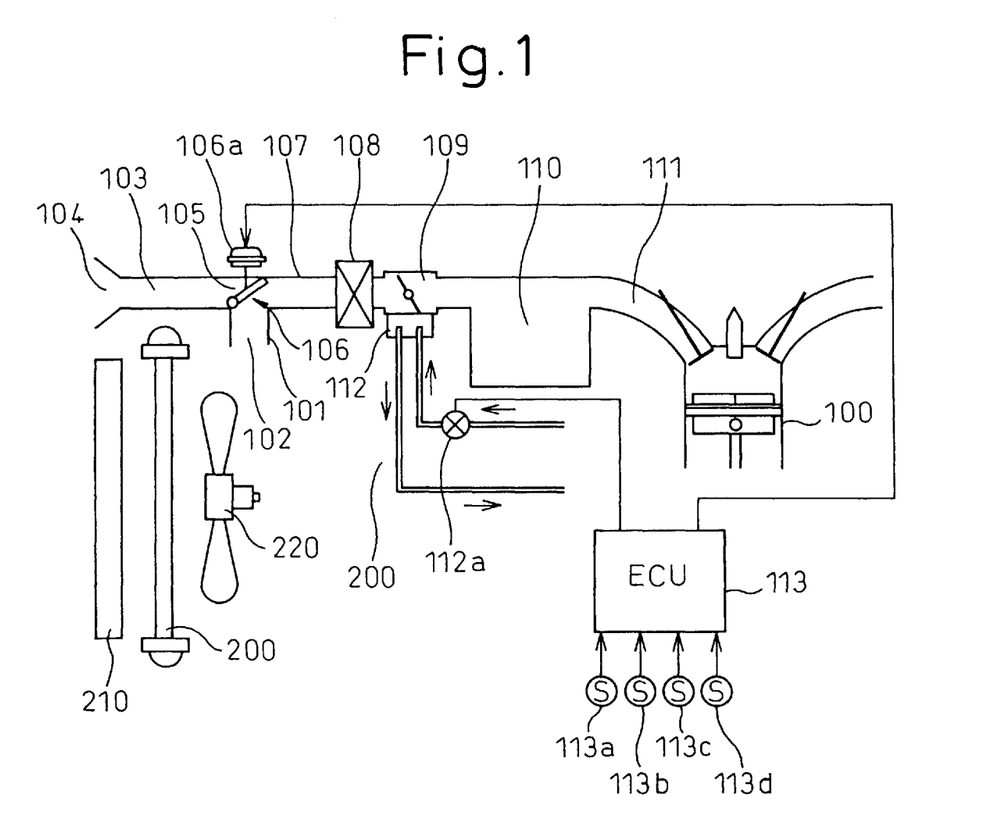
FIG. 1 is a schematic illustration showing an internal combustion engine device of a first embodiment of the present invention.

In this embodiment, an internal combustion engine device of the present invention is applied to a vehicle. FIG. 1 is a schematic illustration showing an internal combustion engine device (engine system) of a first embodiment.

In FIG. 1, reference numeral 100 is an engine used for moving a vehicle. This engine 100 is an internal combustion engine in which mixture of fuel and air is burned (exploded) in a combustion chamber and a piston is operated by the expansion pressure of combustion gas so as to obtain a mechanical output.

Reference numeral 101 is an inside air introducing duct having an inside air suction port 102 from which air in the engine compartment (mechanical room) 11 is taken in, and the thus taken inside air is introduced in the inside air introducing duct to the suction air side of the engine 100. Reference numeral 103 is an outside air introducing duct having an outside air suction port 104, which opens onto the front side of the vehicle, from which air outside the engine compartment 11 is taken into the outside air introducing duct, and the thus taken outside air is introduced to the suction air side of the engine 100.

At the joining section (gathering section) 105 of both ducts 101 and 103, there is provided a suction air change-over door (inside and outside air volume adjusting means) 106 for changing over between a case in which inside air is supplied to the engine 100 and a case in which outside air is supplied to the engine 100 when the inside air suction port 102 (inside air introducing duct 101) and the outside air suction port 104 (outside air introducing duct 103) are changed over being opened and closed. In this embodiment, this suction air change-over door (inside and outside air volume adjusting means) 106 is driven by the electric type actuator 106a.

The joining section 105 of both ducts 101 and 103 is connected with the suction air duct 107 of the engine 100. In the suction air duct 107 on the downstream side of a suction air current with respect to the joining section 105, there are provided an air cleaner 108 for removing dust contained in suction air, a throttle valve (variable throttle means) 109 for variably throttling a suction air passage area and a surge tank 110 for smoothing a pulsation of suction air, wherein these components are successively arranged in series from the upstream side of suction air to the downstream side.

In this connection, suction air which has been smoothed in the surge tank 110 is distributed to each cylinder by the intake manifold 111.

In the throttle valve 109, there is provided a heater (heating means) 112 for heating the throttle valve 109 (especially, the throttle valve for adjusting an idling speed) by the heat of engine coolant. Heating conducted by this heater 112 is controlled by the electric type water valve 112a, which will be referred to as a valve hereinafter, for adjusting a quantity of warm water (coolant) supplied (circulated) to the heater 112.

The valve 112a (heating conducted by the heater 112) and the actuator 106a (ratio of the inside air volume to the outside air volume) are controlled by the electronic control unit (ECU) 113. The electronic control unit (ECU) 113 is inputted with: a detection value of the pressure sensor 113a to detect the suction air pressure right after the throttle valve 109; a detection value of the coolant temperature sensor 113b to detect the temperature of engine coolant; a detection value of the lubricant temperature sensor 113c to detect the temperature of engine oil; and a detection value of the air temperature sensor 113d to detect the temperature of air outside the engine compartment 11. ECU 113 controls the valve 112a (heating conducted by the heater 112) and the actuator 106a (ratio of the volume of inside air to the volume of outside air) by the previously stored program according to these detection values.

In this connection, reference numeral 200 is a radiator for cooling engine coolant. In this embodiment, engine coolant is a fluid in which an antifreeze solution of ethylene glycol is added to water. Reference numeral 210 is a condenser used for the air-conditioner for vehicle use. This condenser 210 is arranged on the upstream side of an air current with respect to the radiator 200. Reference numeral 220 is an axial fan type blower for blowing a cooling air to the radiator 200 and condenser 210.

Figure 2:
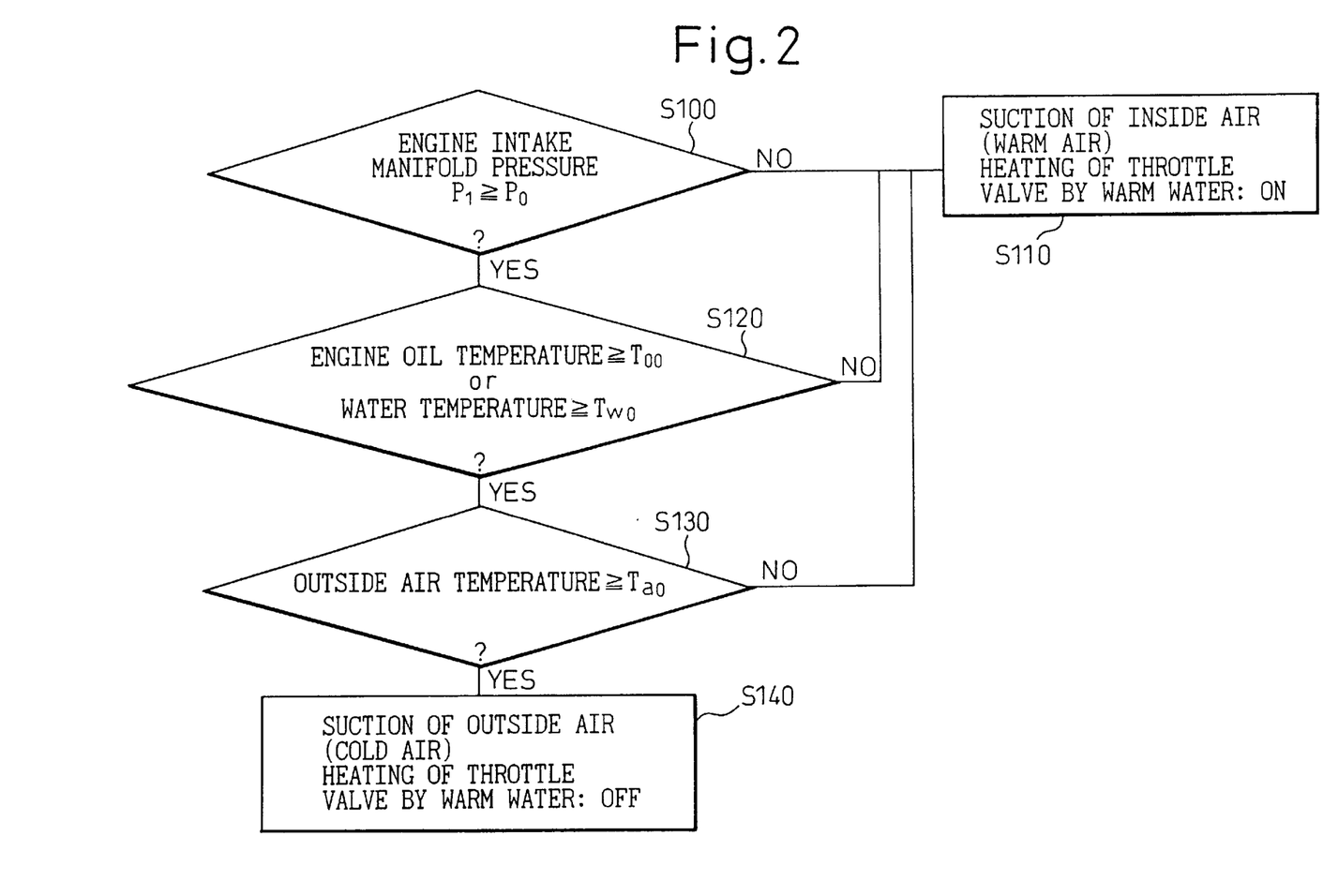
FIG. 2 is a flow chart showing operation of an internal combustion engine device of the first embodiment of the present invention.

Next, explanations will be made into a method of controlling the valve 112a (heating conducted by the heater 112) and the actuator 106a (ratio of the inside air volume to the outside air volume) referring to the flow chart shown in FIG. 2.

Simultaneously, with when the engine 100 is started, the detection pressure P1 of the pressure sensor 113a is read in, and it is judged whether or not the detection pressure is not less than predetermined pressure $P_o$ (S100). When detection pressure of the pressure sensor 113a is lower than P1, it is assumed that the load of the engine 100 is less than a predetermined value, and the outside air suction port 104 is closed and only inside air is supplied to the engine 100. At the same time, the valve 112a is opened so that warm water is supplied to the heater 112 (S110).

On the other hand, when the detection pressure is not less than P1, it is judged whether or not the temperature $T_w$ of engine coolant (detection value of the coolant temperature sensor 113b) is not less than predetermined temperature $T_{wo}$, and it is also judged whether or not the engine oil temperature (detection value of the lubricant oil temperature sensor 113c) $T_o$ is not less than predetermined temperature $T_{oo}$ (S120). When temperature $T_w$ of engine coolant is lower than predetermined temperature $T_{wo}$ and temperature $T_o$ of engine oil is lower than $T_{oo}$, it is assumed that a load of the engine 100 is lighter than a predetermined value, and step S110 is executed.

When temperature $T_w$ of the engine coolant is not less than predetermined temperature $T_{wo}$ or when temperature $T_o$ of the engine oil is not less than predetermined temperature $T_{oo}$, it is judged whether or not temperature $T_a$ (detection value of the air temperature sensor 113d) of air outside the engine compartment 11 is not less than predetermined temperature $T_{ao}$ (S130). When the temperature $T_a$ of air outside the engine compartment 11 is lower than predetermined temperature $T_{ao}$ (0° C. in this embodiment), it is assumed that a load of the engine 100 is less than a predetermined value, and step S110 is executed.

On the other hand, when temperature $T_a$ of air outside the engine compartment 11 is lower than predetermined temperature $T_{ao}$, it is assumed that a load of the engine 100 is not less than a predetermined value and that a possibility of freeze of the throttle valve 109 (especially, the throttle valve for adjusting an idling speed) is very low. Therefore, the inside air suction port 102 is closed and only outside air is supplied to the engine 100, and further the valve 112a is closed so that the supply of warm water to the heater 112 is stopped (S140).

Next, characteristics of the first embodiment will be described below.

According to the first embodiment of the present invention, the valve 112a (heating conducted by the heater 112) and the actuator 106a (ratio of the inside air volume to the outside air volume) are controlled. Therefore, it is possible to supply suction air of an appropriate temperature to the engine 100 according to a state of operation (state of the load) of the engine 100.

In this connection, in general, it is possible to enhance an output (fuel consumption) of the engine when the engine is operated as follows. When a heavy load is given to the engine, the temperature in the combustion chamber is kept relatively low. On the contrary, when a light load is given to the engine, the temperature in the combustion chamber is kept relatively high. In this embodiment, when a load given to the engine 100 is lighter than a predetermined value, the outside air suction port 104 is closed, and only inside air is supplied to the engine 100, and the valve 112a is opened and warm water is supplied to the heater 112. Therefore, when a small load is given to the engine 100, suction air of a relatively high temperature is supplied to the engine 100, so that the fuel consumption can be enhanced.

Further, in this embodiment, when a load given to the engine 100 is not less than a predetermined value, the inside air suction port 102 is closed and only outside air is supplied to the engine 100. In this case, when temperature $T_a$ of air outside the engine compartment 11 is lower than predetermined value $T_{ao}$, the valve 112a is opened, and warm water is supplied to the heater 112. Therefore, the throttle valve 109 can be prevented from freezing.

In this embodiment, when a load given to the engine 100 is not less than a predetermined value and temperature $T_a$ of air outside the engine compartment 11 is lower than predetermined temperature $T_{ao}$, the inside air suction port 102 is closed and only outside air is supplied to the engine 100. At the same time, the valve 112a is closed, so that the supply of warm water to the heater 112 is stopped. Therefore, when a large load is given to the engine 100, suction air of a relatively low temperature is supplied to the engine 100. Accordingly, the fuel consumption can be more enhanced.

As described above, according to the present embodiment, while the throttle valve 109 is being prevented from freezing, it is possible to prevent an output of the engine 100 (fuel consumption of the engine 100) from decreasing.

(Second Embodiment)

Figure 3:
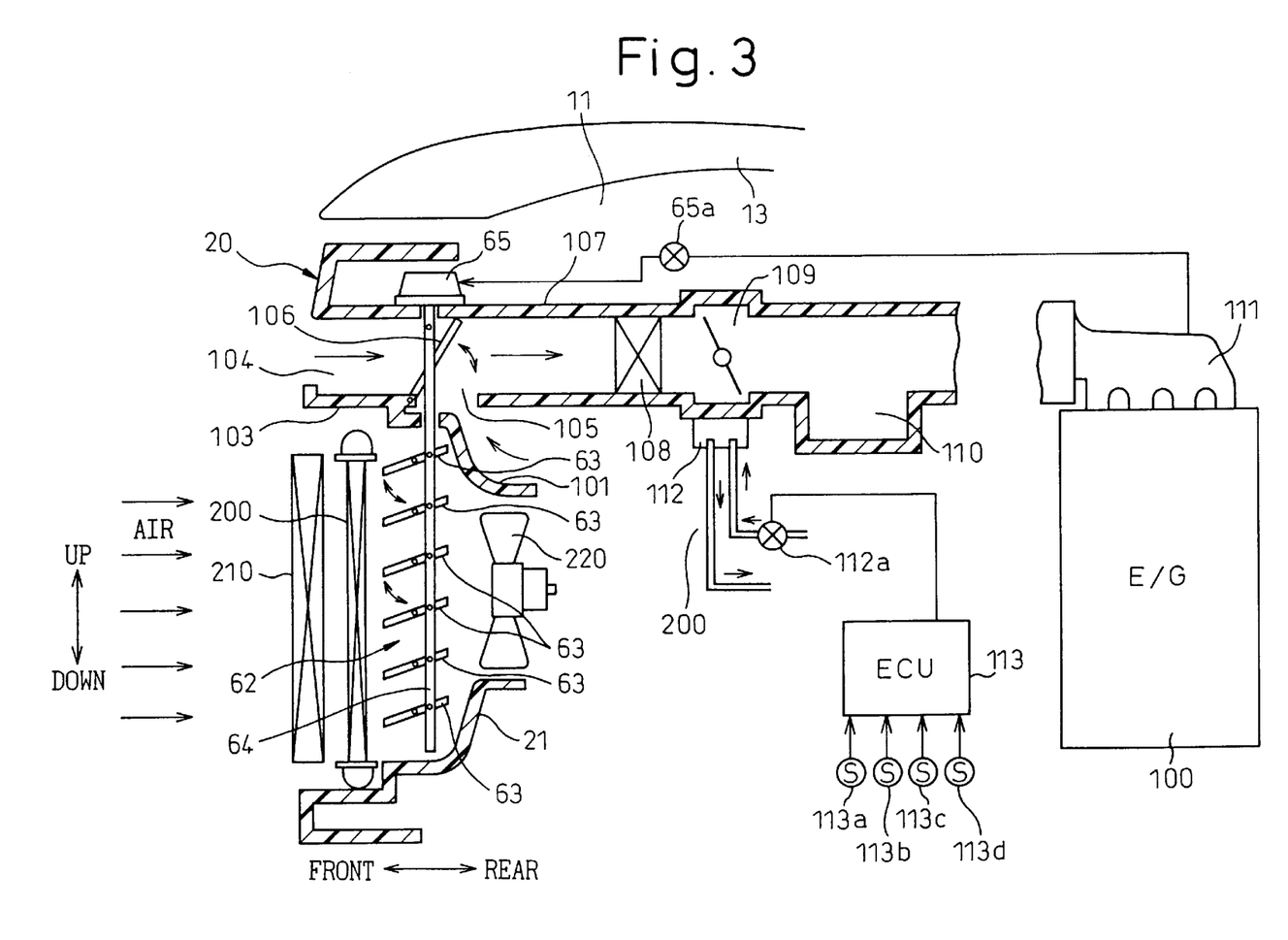
FIG. 3 is a schematic illustration showing an internal combustion engine device of a second embodiment of the present invention.

In order to improve the fuel consumption, the engine control system may include a means for controlling a volume of the cooling air flow supplied to the radiator according to a state of operation of the engine. FIG. 3 is a schematic illustration of a internal combustion engine device (engine system) of a second embodiment of the present invention. In this connection, like reference numerals are used to indicate like parts in Embodiments 1 and 2, and detailed explanations are omitted.

Reference numeral 20 is a front end panel, which will be referred to as a panel hereinafter, which is arranged at the front end portion of the vehicle and extends in the vehicle width direction. This panel 20 separates the engine compartment 11, into which the engine 100 is incorporated, from the outside of the engine compartment 11.

In this connection, reference numeral 111 is an intake manifold (air suction pipe) for distributing suction air to each cylinder, and reference numeral 13 is a hood to cover an upper portion of the engine compartment 11.

In this connection, the radiator 200 is attached to the panel 20 via an elastic damping member (not shown) made of rubber, and the condenser 210 is attached to the radiator 200.

Reference numeral 220 is an axial fan which blows cooling air onto the condenser 210 and radiator 200. This fan 220 is attached to the panel 20 via the shroud 21 for covering a gap between the radiator 200 and the fan 220 so that an air current generated by the fan 220 cannot go around the condenser 210 and the radiator 200.

The inside air introducing duct 101, outside air introducing duct 102, suction air duct 107 and shroud 21 are made by means of an integral molding of resin.

Reference numeral 62 is a blind shutter type cooling wind door (radiator air flow volume adjusting means) which is composed in such a manner that a plurality of belt-shaped opening and closing doors 63 are arranged in a louver window shape. When this cooling air door 62 is opened and closed, the volume of the air flow passing through the condenser 210 and radiator 200 can be adjusted.

The suction air change-over door 106 and the opening and closing door 63 are pivotally supported by the panel 20 under the condition that the longitudinal directions of the suction air change-over door 106 and the opening and closing door 63 are arranged extending in the vehicle width direction. Further, the suction air change-over door 106 and the opening and closing door 63 are moved (opened and closed) by the rod-shaped link member 64 extending in the vertical direction.

Reference numeral 65 is an actuator (drive means) for operating the link member 34 in the vertical direction. This actuator 65 is of the diaphragm type operated by the negative suction pressure generated by the engine.

Due to the structure described above, the suction air change-over door 106 and the opening and closing door 63 are opened and closed by being mechanically linked with the link member 64 connected with the actuator 65. In this connection, negative suction pressure is controlled by the electromagnetic valve 65a.

Figure 4:
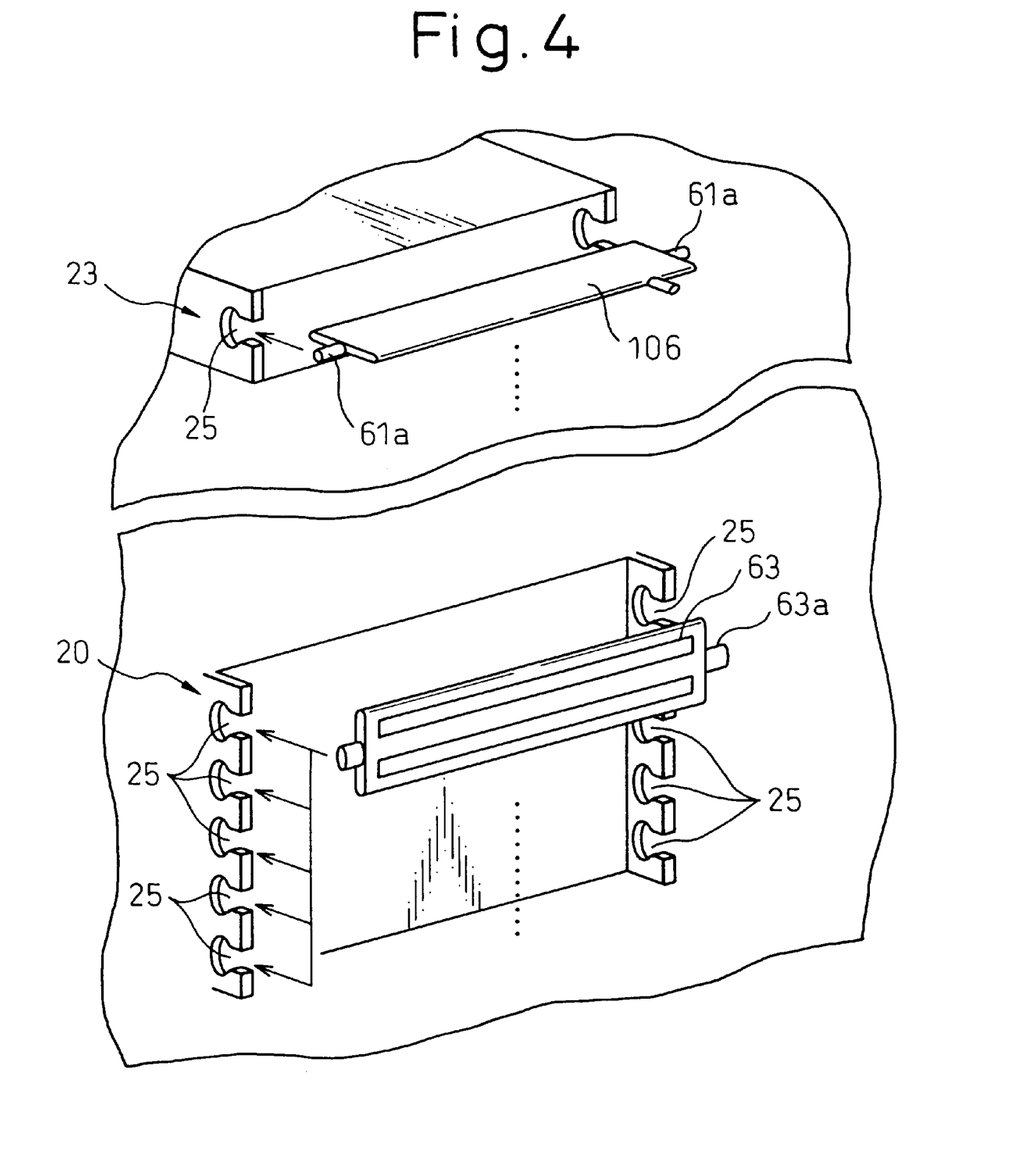
FIG. 4 is an exploded perspective view of a suction air change-over door and cooling air door of the second embodiment of the present invention.

In this connection, as shown in FIG. 4, the suction change-over door 106 and the opening and closing door 63 are pivotally supported in such a manner that the shafts 61a and 63a formed at the end portions in the longitudinal direction of the suction air change-over door 106 and the opening and closing door 63 are attached to the keyhole-shaped door support sections 25 formed on the panel 20.

Figure 5:
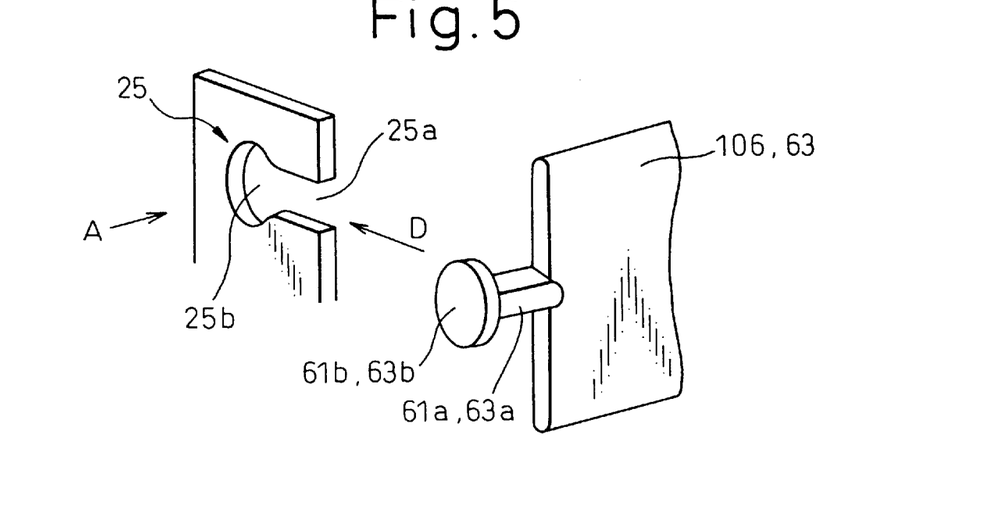
FIG. 5 is an exploded perspective view showing a suction air change-over door and opening and closing door of the first and the second embodiment of the present invention.
Figure 6A:
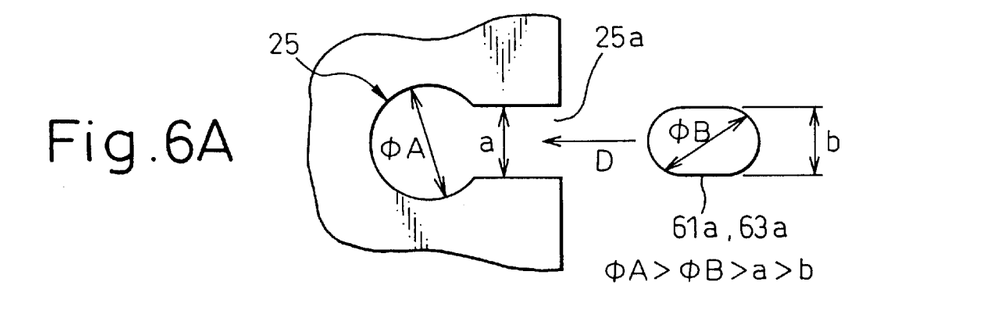
FIGS. 6A and 6B are views taken in the direction of arrow A in FIG. 5.
Figure 6B:
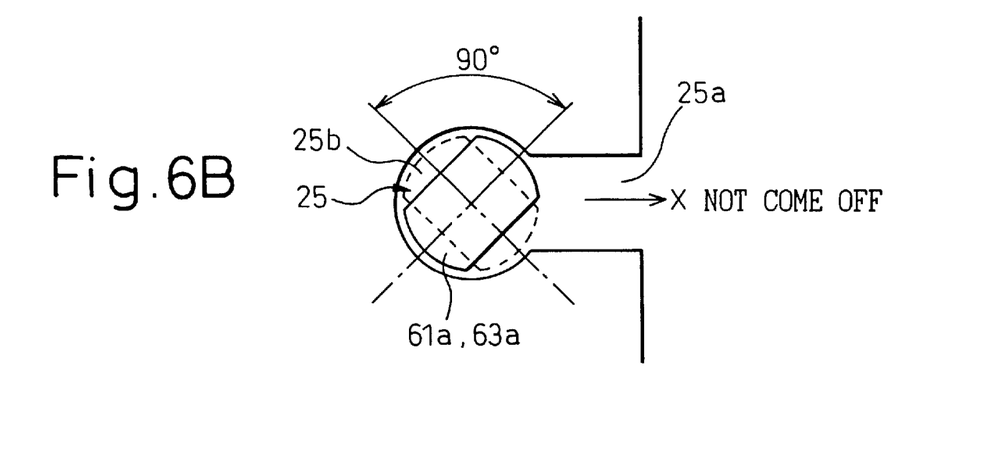

In this case, as shown in FIGS. 5 and 6, the door support section 25 is a keyhole-shaped hole which is a circular hole 25b, the diameter A of which is larger than the opening size "a" of the insertion opening 25a into which each shaft 61a, 63a is inserted. On the other hand, each shaft 61a, 63a has the following sectional profile. The minor axis size "b" of the shaft 61a, 63a is approximately the same as the opening size "a", and the major axis size B of the shaft 61a, 63a is approximately the same as the diameter A, that is, each shaft 61a, 63a has a cross section of a substantial ellipse. On the forward end side of each shaft 61a, 63a, there is provided a disk-shaped umbrella portion (stopper) 61b, 63b, the size of which is larger than the diameter A of the circular hole 25b.

Due to the above structure, if the moving angles (rotary angles) of the suction air change-over door 106 and the opening and closing door 63 are not more than 90°, the suction air change-over door 106 and the opening and closing door 63 do not come off from the door support section 25, and the shafts 61a, 63a can be stably moved (rotated).

Figure 7:
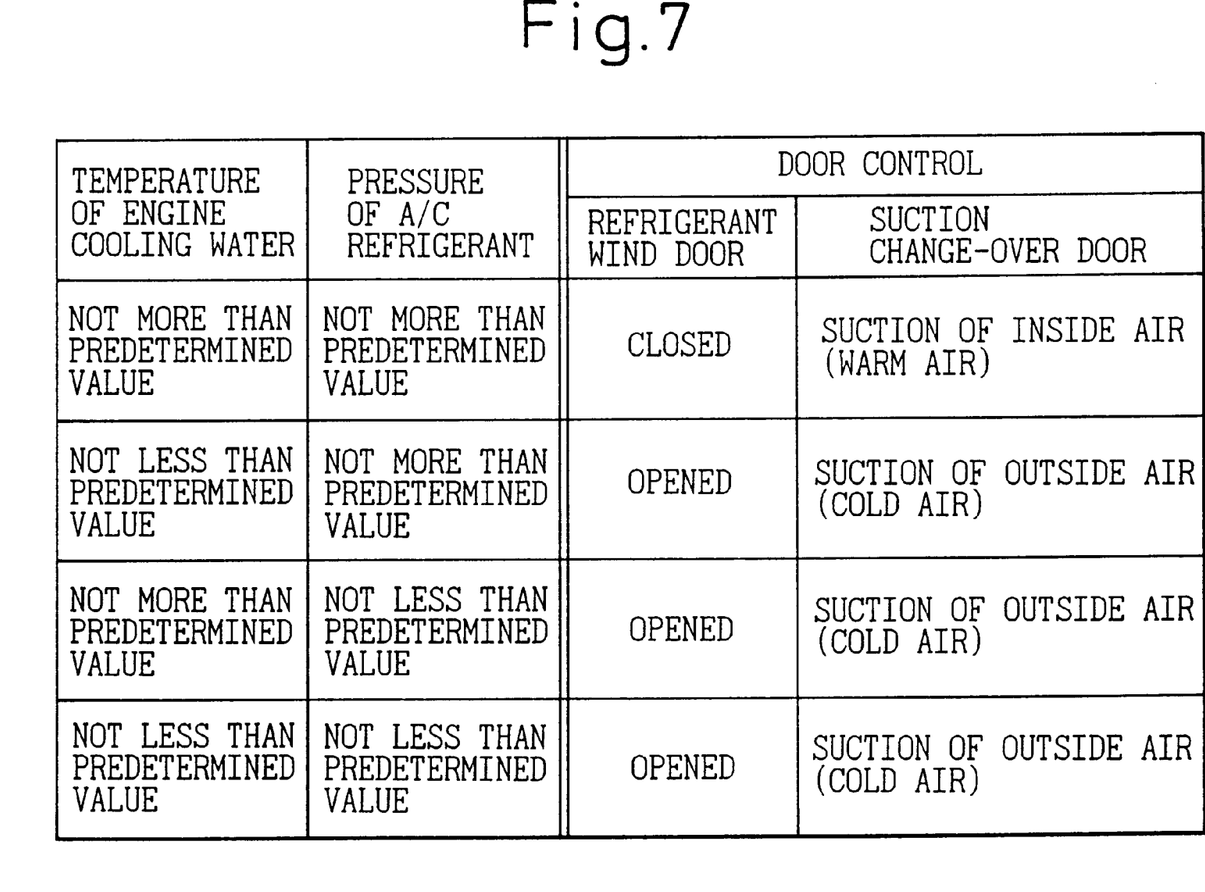
FIG. 7 is a table showing a control pattern of the suction air change-over door and cooling air door of the second embodiment of the present invention.

In this connection, FIG. 7 is a table showing an opening and closing operation of the suction air change-over door 106 and the cooling air door 62. According to FIG. 7, the characteristic operation of the internal combustion engine device of the second embodiment will be described below.

When the pressure of the refrigerant on the high pressure side of an air conditioner (delivery pressure of a compressor) is not more than a predetermined value and the temperature of the engine coolant is not more than a predetermined value (for example, 90° C.), the cooling wind door 62 is closed and the suction change-over door 106 is operated so that inside air can be introduced into the suction air duct 107. At this moment, the water valve 112a is open, and warm water is supplied to the heater 112.

Due to the foregoing, it becomes possible to supply suction air of a relatively high temperature to the engine, and further it becomes possible to prevent heat of the engine coolant (engine) from being dissipated from the radiator 200 into the atmosphere. Therefore, warming up can be facilitated while the engine startability is being enhanced.

When the pressure of the refrigerant on the high pressure side of an air conditioner is not more than a predetermined value and the temperature of the engine coolant is higher than a predetermined value, the cooling air door 62 is opened and the suction change-over door 106 is operated so that outside air can be introduced into the suction air duct 107.

Due to the foregoing, outside air, the temperature of which is lower than that of inside air, can be supplied to the engine 100, and the engine coolant (engine) can be cooled. Therefore, it becomes possible to prevent an engine output from lowering, and the fuel consumption can be improved.

When the refrigerant pressure on the high pressure side of the air conditioner is higher than a predetermined value, the cooling air door 62 is opened without using the engine coolant, and the suction change-over door 106 is operated so that outside air can be introduced into the suction air duct 107.

Due to the foregoing, the condenser 210 (refrigerant on the high pressure side) can be cooled. Therefore, pressure of the refrigerant on the high pressure side can be reduced, and the freezing capacity of the air conditioner can be enhanced.

In this embodiment, the suction air change-over door 106 and the cooling air door 62 are mechanically linked with each other and can be operated by one actuator 65. Therefore, the number of parts composing the system can be reduced while the suction control system and the radiator control system are being operated.

In this connection, in this embodiment, the suction air change-over door 106 and the cooling air door 62 are controlled to be open or closed, however, the present invention is not limited to the above specific embodiment. The suction air change-over door 106 and the cooling air door 62 may be controlled so that they can be opened to an intermediate opening degree.

(Third Embodiment)

Figure 8A:
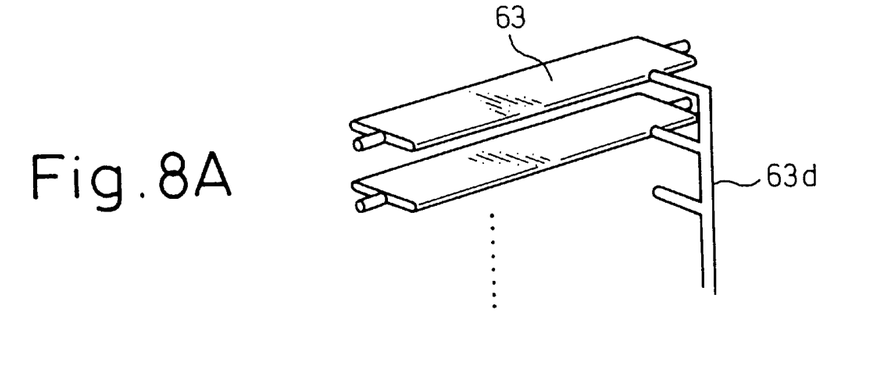
FIGS. 8A to 8C are schematic illustrations showing an assembling method of the suction air change-over door and opening and closing door of a third embodiment of the present invention.
Figure 8B:
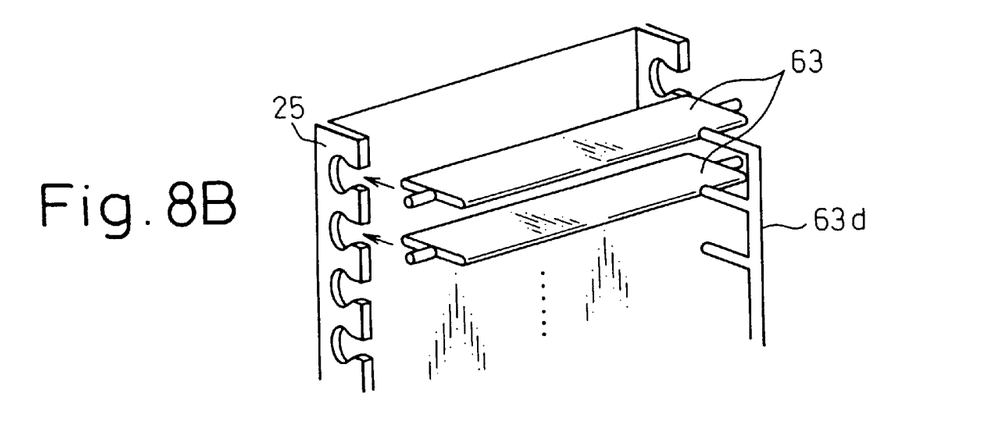
Figure 8C:
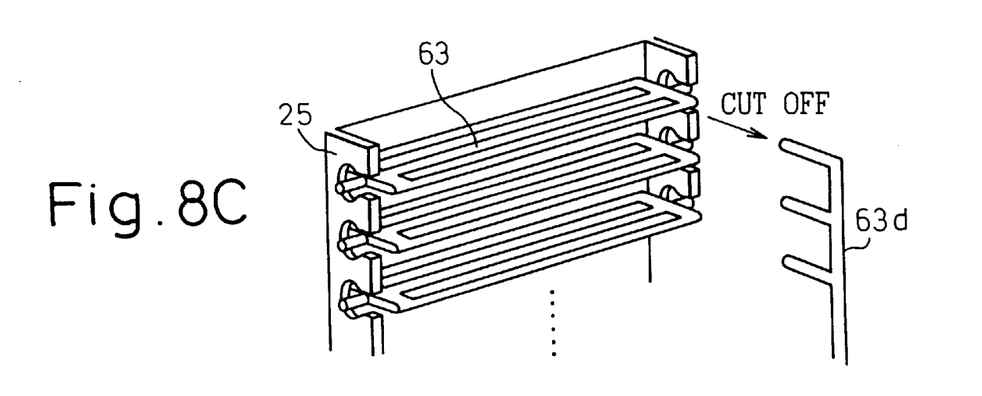

In this embodiment, the assembling property of the opening and closing door 63, which composes the cooling air door 62, to the door supporting section 25 (panel 20) is improved.

The specific structure will be described as follows. As shown in FIG. 8A, when the opening and closing door 63 is formed by means of resin molding, the holding section 63d to hold a plurality of opening and closing doors 63 is integrally formed. As shown in FIG. 8B, while the plurality of opening and closing doors 63 are being held by the holding section 63d, the plurality of opening and closing doors 63 are incorporated into the door supporting section 25. After that, the holding section 63d is cut off as shown in FIG. 8C.

Due to the foregoing, the plurality of opening and closing doors 63 can be assembled to the door support section 25 (panel 20) in one process. Therefore, the assembling property can be enhanced.

In the above embodiment, the suction air change-over door 106 and the water valve 112*a* are subjected to ON-OFF control (change-over control). However, the present invention is not limited to the above specific embodiment. The ratio of the volume of inside air to the volume of outside air and the degree (heating) of opening of the water valve 112*a* may be continuously controlled according to a load given to the engine 100.

In the above embodiment, the present invention is applied to an engine for vehicle use. However, the present invention is not limited to the above specific embodiment. The present invention can be applied to a stationary type engine (internal combustion engine).

In the above embodiment, the suction air volume adjusting means for adjusting the volumes of inside and outside air supplied to the engine 100 and also adjusting a total volume of air supplied to the engine 100 is composed in such a manner that the suction air change-over door 106 is arranged at the joining section (gathering section) 105 of both ducts 101 and 103 and that the throttle valve 109 is arranged on the downstream side of the suction air change-over door 106. However, the present invention is not limited to the above specific embodiment. For example, the suction air change-over door 106 may be abolished and both ducts 101 and 103 may be respectively provided with a throttle valve (variable throttle valve).

In the embodiment described above, in the case of an automatic transmission vehicle, it is possible to provide a judgment step in which the program proceeds to S130 when the ATF temperature is not less than a predetermined value.

Figure 9:
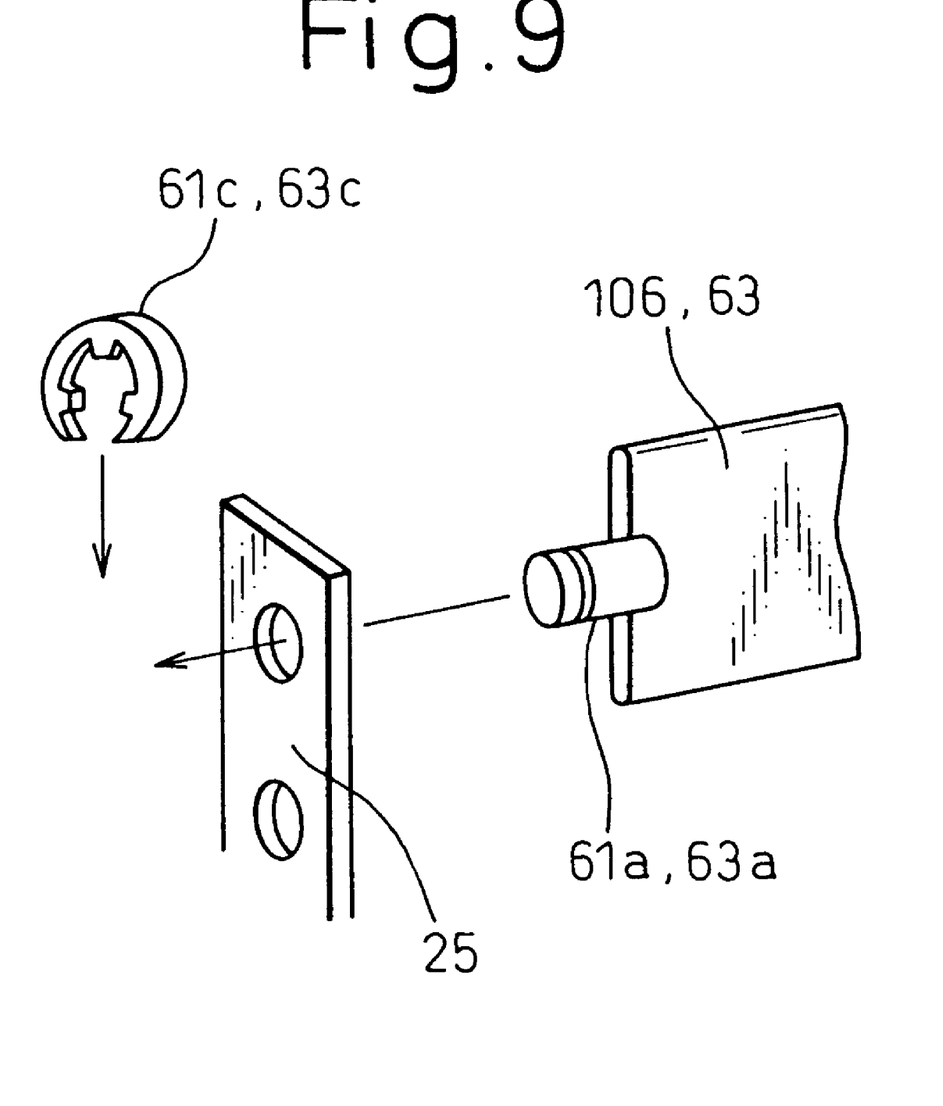
FIG. 9 is an exploded perspective view showing a suction air change-over door and opening and closing door of another embodiment of the present invention.

In the second embodiment, the keyhole-shaped door support section 25 is provided on the panel 20, and the profile of the cross section of the shaft 61*a*, 53*a* is formed into a substantial ellipse. However, in this embodiment, as shown in FIG. 9, the door support section 25 is formed into a simple circle. After the shaft 61*a*, 63*a* has been assembled into the door support section 25, the stopper 61*c*, 63*c* such as an E-shaped or C-shaped fastening ring for preventing the shaft 61*a*, 63*a* from coming out is attached to the forward end side of the shaft 61*a*, 63*a*.

In the above embodiment, concerning the actuator 65, there is provided a diaphragm type actuator which operates by negative pressure of suction of the engine 100. However, the present invention is not limited to the above specific embodiment. For example, a servo motor or another drive means may be adopted.

In the above embodiment, the shroud 21, suction air duct 107, inside air introducing duct 101 and outside air introducing duct 103 are formed integrally with the panel 20. However, the present invention is not limited to the above specific embodiment. The above components may be assembled onto the panel 20 after they are separately manufactured.

In the above embodiment, the panel 20 is made of resin. However, the present invention is not limited to the above specific embodiment. The panel 20 may be made of a metal such as aluminum.

In this connection, the specific embodiments of the present invention are described above in detail. However, variations may be made by one skilled in the art without departing from the spirit and scope of the present invention.

What is claimed is:

1. An internal combustion engine device comprising:
a suction air duct for introducing combustion air into an internal combustion engine;
an inside air introducing duct having an inside air suction port for taking in air from an engine compartment into which the internal combustion engine is incorporated, the inside air introducing duct introducing the thus taken inside air into the suction air duct;
an outside air introducing duct having an outside air suction port for taking in outside air from the outside of the engine compartment, the outside air introducing duct introducing the thus taken outside air into the suction air duct;
an inside and outside air volume adjusting means for adjusting a ratio of a volume of inside air to that of outside air, introduced into the suction air duct;
a suction air volume adjusting means for adjusting a volume of all air supplied to the suction air duct;
a heating means for heating the suction air volume adjusting means, the heating means being capable of variably controlling the heating; and
a control means for controlling the suction air volume adjusting means and the heating means, wherein when a load of the internal combustion engine is lower than a predetermined value, the inside and outside air volume adjusting means is controlled by the control means so that the inside air, the volume of which is larger than that of the outside air, can be supplied to the internal combustion engine, and the heating means is controlled by the control means so that the suction air volume adjusting means can be heated.

2. An internal combustion engine device according to claim 1, wherein the suction air volume adjusting means is a variable throttling means for variably controlling an air passage area, arranged on the downstream side of an air current with respect to the inside and outside air volume adjusting means.

3. An internal combustion engine device according to claim 1, wherein an outside air temperature detecting means for detecting the temperature of outside air sucked from the outside air suction port into the outside air introducing duct is arranged in the outside air introducing duct, and when a load of the internal combustion engine is not less than a predetermined value and the outside air temperature detected by the outside air temperature detecting means is lower than a predetermined value, the outside air, the volume of which is larger than that of the inside air, is supplied to the internal combustion engine and the suction air volume adjusting means is heated.

4. An internal combustion engine device according to claim 1, wherein when a load of the internal combustion engine is not less than a predetermined value and the outside air temperature detected by the outside air temperature detecting means is not less than a predetermined value, the outside air, the volume of which is larger than that of the inside air, is supplied to the internal combustion engine and the suction air volume adjusting means is not heated.

5. An internal combustion engine device according to claim 1, further comprising: a radiator for exchanging heat between coolant to cool the internal combustion engine and outside air so as to cool the coolant; and a radiator air flow volume adjusting means for adjusting a volume of the air flow passing through the radiator.

6. An internal combustion engine device according to claim 5, wherein the inside and outside air volume adjusting means and radiator air flow volume adjusting means are mechanically linked with each other and operated by one drive means.

7. An internal combustion engine device according to claim 6, the inside and outside air volume adjusting means including a belt-shaped first opening and closing door for opening and closing an air passage, arranged between the inside air introducing duct and outside air introducing duct, the radiator air flow volume adjusting means including a plurality of belt-shaped second opening and closing doors which are arranged in a louver window shape, wherein the first and the second opening and closing door are driven by a link member connected with the drive means.

8. An internal combustion engine device according to claim 7, wherein a support section for pivotally supporting the first and the second opening and closing door is arranged on a front end panel arranged in the front end portion of a vehicle extending in the width direction of the vehicle.

9. An internal combustion engine device according to claim 8, wherein the suction air introducing duct, the inside air introducing duct and the outside air introducing duct are formed on the front end panel.

10. An internal combustion engine device according to claim 8, wherein the front end panel is formed integrally with a shroud for covering a gap between the radiator and a fan, which sends a cooling air for cooling the radiator, so that an air current generated by the fan cannot go around the radiator.

11. An internal combustion engine device according to claim 9, wherein the front end panel is formed integrally with a shroud for covering a gap between the radiator and the fan, which sends a cooling air for cooling the radiator, so that an air current generated by the fan cannot go around the radiator.

* * * * *